United States Patent
Janani et al.

(10) Patent No.: US 11,652,560 B1
(45) Date of Patent: May 16, 2023

(54) APPARATUS, SYSTEM, AND METHOD FOR CALIBRATING TRANSCEIVERS IN BEAMFORMING ANTENNAS OVER THE AIR WITHOUT CALIBRATION CIRCUITRY

(71) Applicant: Meta Platforms, Inc., Menlo Park, CA (US)

(72) Inventors: Mohammad Janani, San Jose, CA (US); Farbod Tabatabai, San Francisco, CA (US); Kodanda Ram Reddy Engala, Irving, TX (US); Djordje Tujkovic, Los Altos, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/691,833

(22) Filed: Mar. 10, 2022

(51) Int. Cl.
  *H04B 17/354* (2015.01)
  *H04B 17/21* (2015.01)
  *H04B 17/11* (2015.01)
  *H04B 7/06* (2006.01)

(52) U.S. Cl.
  CPC ......... *H04B 17/354* (2015.01); *H04B 7/0617* (2013.01); *H04B 17/11* (2015.01); *H04B 17/21* (2015.01)

(58) Field of Classification Search
  CPC .... H04B 17/354; H04B 7/0617; H04B 17/11; H04B 17/21
  See application file for complete search history.

(56) References Cited

U.S. PATENT DOCUMENTS

| | | | |
|---|---|---|---|
| 2012/0129469 A1* | 5/2012 | Lorenz | H03F 3/602 455/73 |
| 2014/0153461 A1* | 6/2014 | Lorenz | H04W 52/0245 370/311 |
| 2016/0226564 A1* | 8/2016 | Taherzadeh Boroujeni | H04B 7/0452 |
| 2017/0317724 A1* | 11/2017 | Khandani | H01Q 25/007 |

\* cited by examiner

*Primary Examiner* — Sung S Ahn
(74) *Attorney, Agent, or Firm* — Greenberg Traurig, LLP

(57) ABSTRACT

An antenna system comprising (1) a plurality of transceivers capable of being calibrated over the air to improve beamforming and (2) at least one controller communicatively coupled to the plurality of transceivers, wherein the controller (A) identifies a set of partially overlapping subgroups that include the plurality of transceivers, (B) obtains leakage measurements taken in connection with signals emitted by at least one transceiver included in each of the partially overlapping subgroups, (C) identifies, within the leakage measurements, a subset of leakage measurements taken in connection with an overlapping transceiver and multiple non-overlapping transceivers included in the set of partially overlapping subgroups, and (D) calibrates, based at least in part on the subset of leakage measurements, the plurality of transceivers with respect to at least one feature to improve beamforming. Various other apparatuses, systems, and methods are also disclosed.

20 Claims, 6 Drawing Sheets

APPARATUS, SYSTEM, AND METHOD FOR CALIBRATING TRANSCEIVERS IN BEAMFORMING ANTENNAS OVER THE AIR WITHOUT CALIBRATION CIRCUITRY

BRIEF DESCRIPTION OF DRAWINGS

The accompanying Drawings illustrate a number of exemplary embodiments and are parts of the specification. Together with the following description, the Drawings demonstrate and explain various principles of the instant disclosure.

Figure 1:
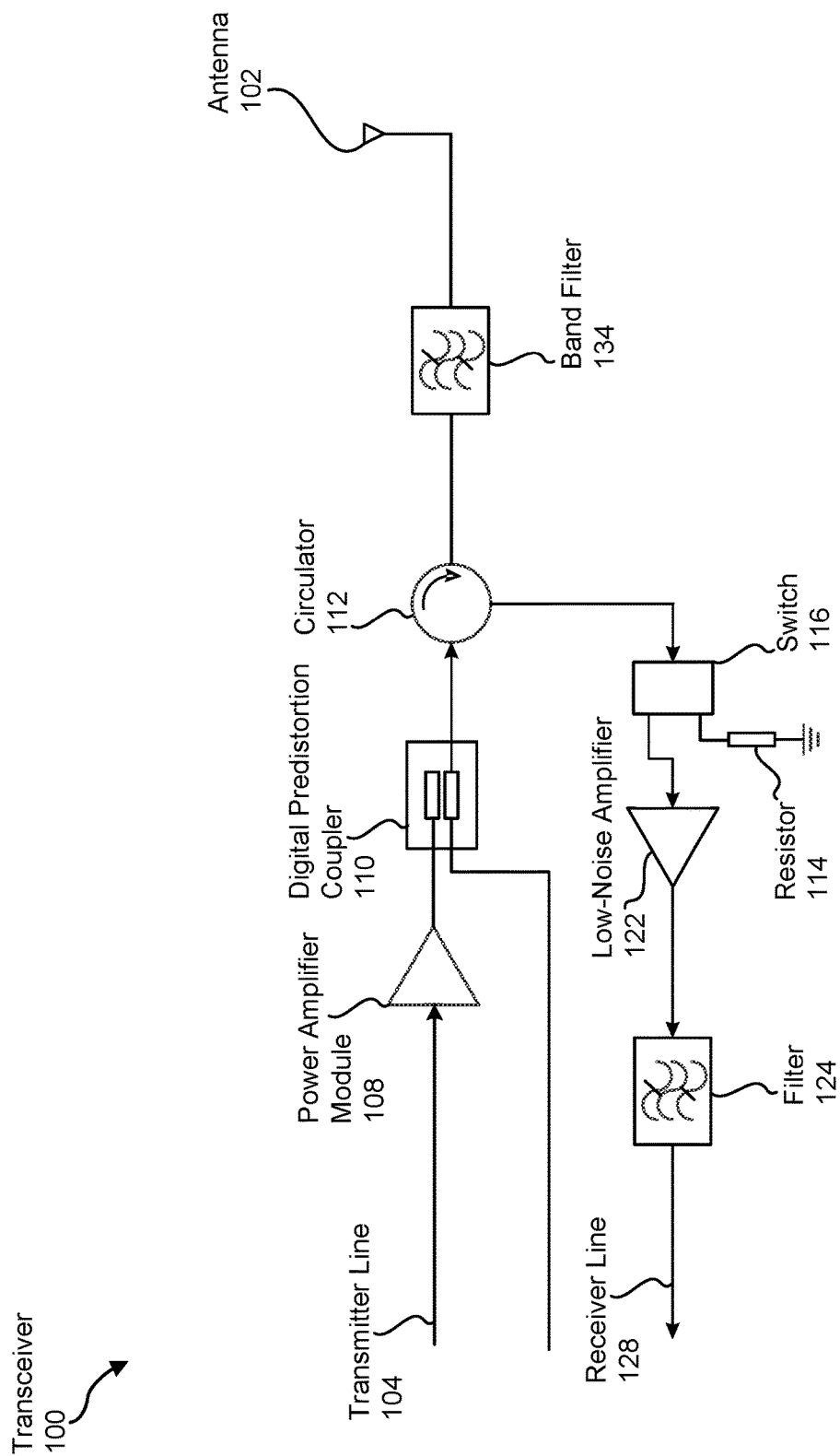
FIG. 1 is an illustration of an exemplary transceiver capable of being calibrated over the air according to one or more embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION

The present disclosure is generally directed to apparatuses, systems, and methods for calibrating transceivers in beamforming antennas over the air without calibration circuitry. As will be explained in greater detail below, these apparatuses, systems, and methods may provide numerous features and benefits.

To support efficient and/or effective beamforming, certain antenna systems and/or configurations may benefit from and/or improve with calibration every so often. For example, some multiple-input multiple-output (MIMO) antenna systems may include and/or represent various transceivers that are not equipped with dedicated calibration circuitry. As a result, these MIMO antenna systems may be unable to achieve optimal beamforming without expensive and/or time-consuming upgrades. The instant disclosure, therefore, identifies and addresses a need for additional apparatuses, systems, and methods that facilitate calibrating transceivers that are not equipped with dedicated calibration circuitry in beamforming antennas.

In some examples, an antenna system (such as a massive MIMO system) may be able to achieve and/or perform over-the-air calibration of its radio transceivers even if those radio transceivers are not equipped with dedicated calibration circuitry. For example, a massive MIMO (MaMIMO) antenna system may include and/or represent various radio transceivers that are assigned to one of several partially overlapping subgroups. In this example, each subgroup may include and/or incorporate a reference transceiver, a set of auxiliary transceivers adjacent to the reference transceiver, and/or various member transceivers. Some of the member transceivers may overlap with at least one other subgroup, while other member transceivers may overlap with no other subgroups.

To ensure proper calibration for optimal beamforming by the MaMIMO antenna system, a controller communicatively coupled to the radio transceivers may obtain leakage measurements for all the radio transceivers included in the partially overlapping subgroups. The controller may identify those leakage measurements that were taken as deltas between the reference transceivers and overlapping transceivers included in multiple subgroups. The controller may then calibrate and/or synchronize all the transceivers included in the MaMIMO antenna system with respect to a certain phase and/or magnitude based at least in part on those leakage measurements. By doing so, the controller may enable the MaMIMO antenna system to improve, maximize, and/or optimize its beamforming capabilities, performance, and/or efficiency.

The following will provide, with reference to FIGS. 1-5, detailed descriptions of exemplary devices, systems, components, and corresponding implementations for calibrating transceivers over the air without calibration circuitry. In addition, detailed descriptions of methods for calibrating transceivers over the air without calibration circuitry in connection with FIG. 6.

FIG. 1 illustrates an exemplary transceiver 100 that facilitates the transmission and/or reception of radio communications in connection with an antenna system. As illustrated in FIG. 1, exemplary transceiver 100 may include and/or represent an antenna 102, a power amplifier module 108, a digital predistortion coupler 110, a circulator 112, a switch 116, a resistor 114, a low-noise amplifier 122, a filter 124, and/or a band filter 134. In some examples, transceiver 100 may be able to transmit and/or launch signals via a transmitter line 104 and/or antenna 102. Additionally or alternatively, transceiver 100 may be able to receive and/or obtain signals and/or leakage via a receiver line 128 and/or antenna 102.

In some examples, a signal may be provided and/or delivered by a certain radio component (not necessarily illustrated in FIG. 1) to the input of power amplifier module 108 via transmitter line 104. In one example, the output of power amplifier module 108 may be directly or indirectly communicatively coupled to an input of digital predistortion coupler 110 along the transmitter line of transceiver 100. In this example, the output of digital predistortion coupler 110 may be directly or indirectly communicatively coupled to a port of circulator 112. Additionally or alternatively, another port of circulator 112 may be directly or indirectly communicatively coupled to antenna 102. For example, band filter 134 may be communicatively coupled between that port of circulator 112 and antenna 102.

In one example, a further port of circulator 112 may be directly or indirectly communicatively coupled to the input of switch 116. In this example, one output of switch 116 may be directly or indirectly communicatively coupled to one side of resistor 114. Another side of resistor 114 may be directly or indirectly communicatively coupled to ground.

In one example, another output of switch 116 may be directly or indirectly communicatively coupled to the input of low-noise amplifier 122. In this example, the output of low-noise amplifier 122 may be directly or indirectly communicatively coupled to the input of filter 124. Additionally or alternatively, the output of filter 124 may provide and/or deliver a signal to a certain radio component (not necessarily illustrated in FIG. 1) via receiver line 128.

In addition to the various components illustrated in FIG. 1, exemplary transceiver 100 may include one or more other components that are not illustrated and/or labelled in FIG. 1. For example, exemplary transceiver 100 may include and/or incorporate additional circuitry, electrical components, filters, interfaces, sensors, and/or devices. Alternatively, although exemplary transceiver 100 includes the various components illustrated in FIG. 1, other embodiments of such a transceiver may omit and/or exclude one or more of those components.

As will be described in greater detail below, certain MaMIMO antenna systems and/or configurations may include and/or represent various instances of transceiver 100. For example, a MaMIMO antenna system may include and/or represent 32 individual radio transceivers that contribute to and/or support beamforming. In another example, a MaMIMO antenna system may include and/or represent 64 individual radio transceivers that contribute to and/or support beamforming. In a further example, a MaMIMO antenna system may include and/or represent 128 individual radio transceivers that contribute to and/or support beamforming. Regardless of the actual number of radio transceivers included in such a MaMIMO system, the MaMIMO's beamforming may benefit from and/or improve with the over-the-air calibration and/or synchronization techniques described below, especially if the MaMIMO's transceivers are not equipped with calibration circuitry.

Figure 2:
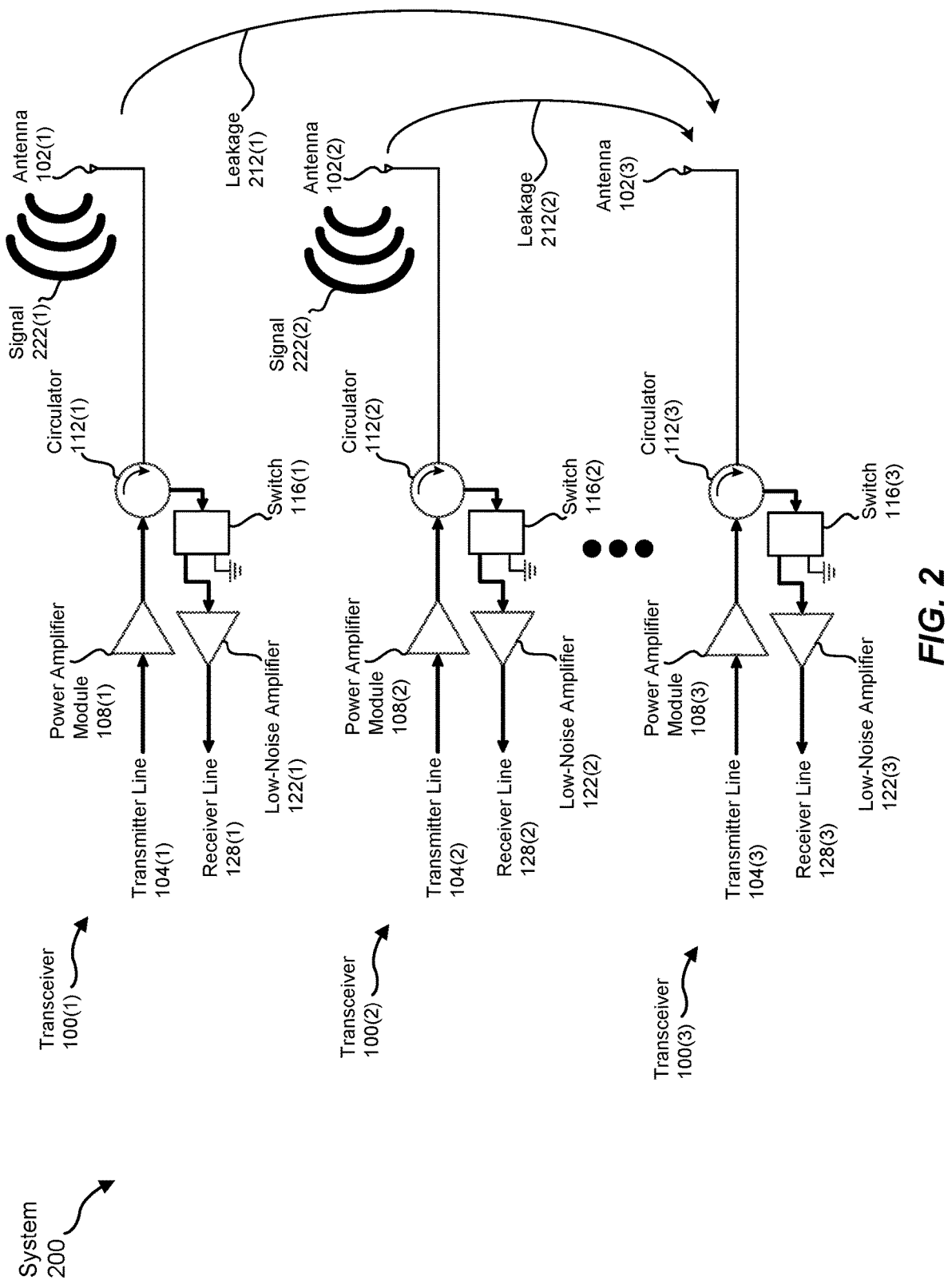
FIG. 2 is an illustration of an exemplary system for calibrating transceivers in beamforming antennas over the air without calibration circuitry according to one or more embodiments of this disclosure.
Figure 4:
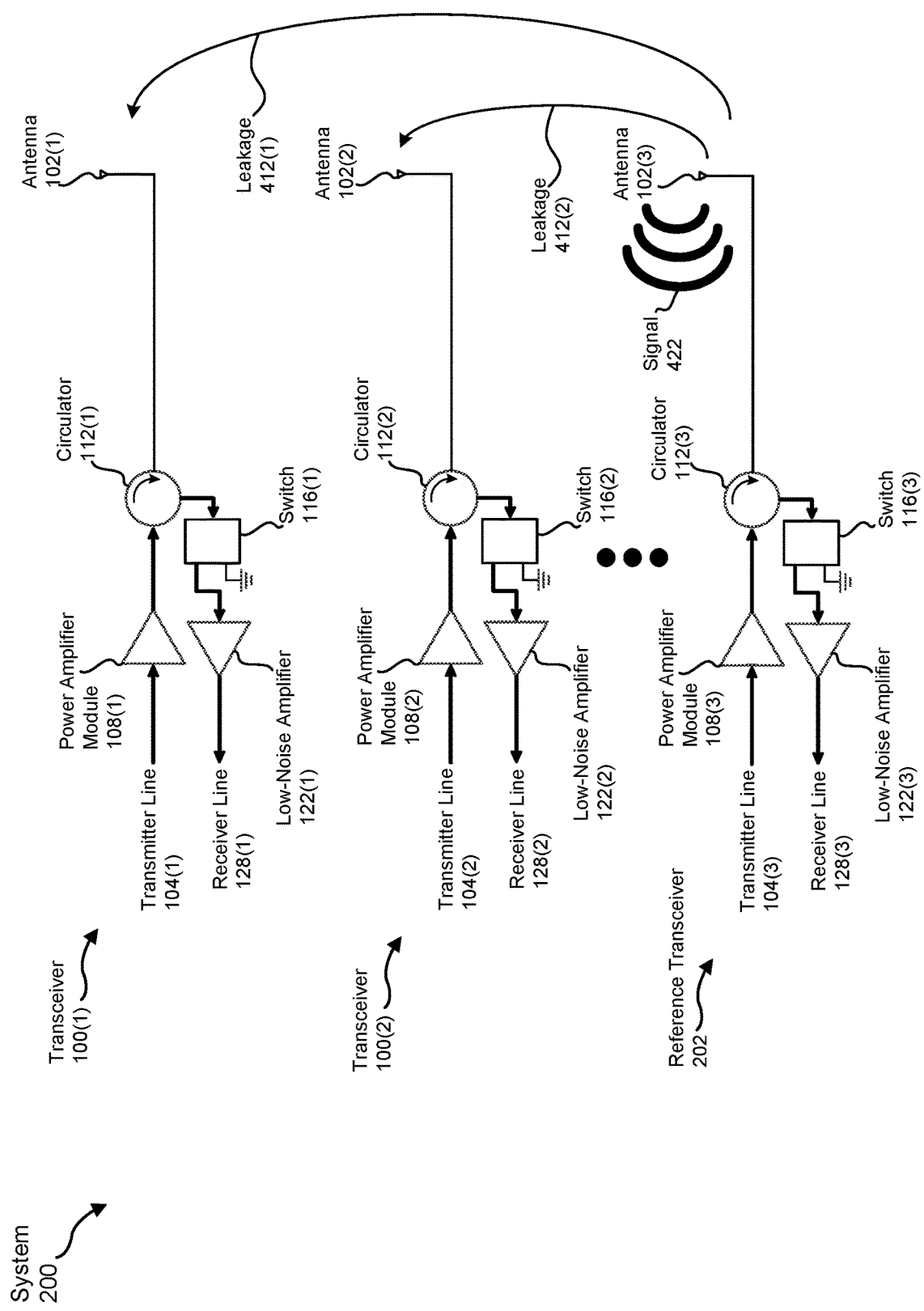
FIG. 4 is an illustration of an exemplary system for calibrating transceivers in beamforming antennas over the air without calibration circuitry according to one or more embodiments of this disclosure.

FIGS. 2 and 4 illustrate an exemplary system 200 that includes various transceivers used to measure leakage from radio communications and then calibrate one another based at least in part on such leakage. In some examples, exemplary system 200 may include and/or represent any of the components discussed above in connection with FIG. 1 (whether or not explicitly illustrated in FIG. 2 or 4). Additionally or alternatively, exemplary system 200 may include and/or represent one or more additional components that are not necessarily illustrated and/or labelled in any of FIG. 1, 2, or 4. Moreover, other embodiments of exemplary system 200 may omit and/or exclude one or more components illustrated and/or labeled in FIG. 2 or 4.

As illustrated in FIGS. 2 and 4, exemplary system 200 may include and/or represent transceiver 100(1), transceiver 100(2), and/or a transceiver 100(3). In some examples, transceiver 100(1) may include and/or represent an antenna 102(1), a power amplifier module 108(1), a circulator 112(1), a switch 116(1), and/or a low-noise amplifier 122(1). In some examples, as illustrated in FIG. 2, transceiver 100(1) may be able to transmit and/or launch a signal 222(1) via transmitter line 104(1) and/or antenna 102(1). Additionally or alternatively, as illustrated in FIG. 4, transceiver 100(1) may be able to detect, receive, and/or obtain leakage 412(1) from a signal 422 via receiver line 128(1) and/or antenna 102(1).

Similarly, transceiver 100(2) may include and/or represent an antenna 102(2), a power amplifier module 108(2), a circulator 112(2), a switch 116(2), and/or a low-noise amplifier 122(2). In some examples, as illustrated in FIG. 2, transceiver 100(2) may be able to transmit and/or launch a signal 222(2) via transmitter line 104(2) and/or antenna 102(2). Additionally or alternatively, as illustrated in FIG. 4, transceiver 100(2) may be able to detect, receive, and/or obtain leakage 412(2) from signal 422 via receiver line 128(2) and/or antenna 102(2).

In some examples, one or more transceivers included in system 200 may serve and/or function as a reference for calibrating the other transceivers. In one example, such reference transceivers may be selected and/or designated due at least in part to their respective positions in a MIMO antenna arrangement and/or configuration. For example, a reference transceiver may be selected and/or designated due at least in part to its position towards a central region of a certain grouping of transceivers within a MIMO antenna arrangement and/or configuration. In this example, the position and/or location of the reference transceiver may ensure that leakage from signals transmitted via the reference transceiver's antenna would reach all the transceivers included in that certain grouping. Such leakage may exhibit, represent, and/or reach a certain magnitude, intensity, and/or energy threshold across all the transceivers included in that certain grouping.

As an example, transceiver 100(3) may serve as a reference that includes and/or represents an antenna 102(3), a power amplifier module 108(3), a circulator 112(3), a switch 116(3), and/or a low-noise amplifier 122(3). In some examples, as illustrated in FIG. 4, transceiver 100(3) may be able to transmit and/or launch signal 422 via transmitter line 104(3) and/or antenna 102(3). Additionally or alternatively, as illustrated in FIG. 2, transceiver 100(3) may be able to detect, receive, and/or obtain leakages 212(1) and 212(2) from signals 222(1) and 222(2), respectively, via receiver line 128(3) and/or antenna 102(3).

In some examples, a MaMIMO may include and/or represent various transceivers that are each applied to and/or included in at least one partially overlapping subgroup. Each partially overlapping subgroup may include and/or represent some transceivers that are shared in common with at least one other partially overlapping subgroup of the MaMIMO. In addition, each partially overlapping subgroup may include and/or represent other transceivers that are not shared in common with any other partially overlapping subgroup of the MaMIMO.

Figure 3:
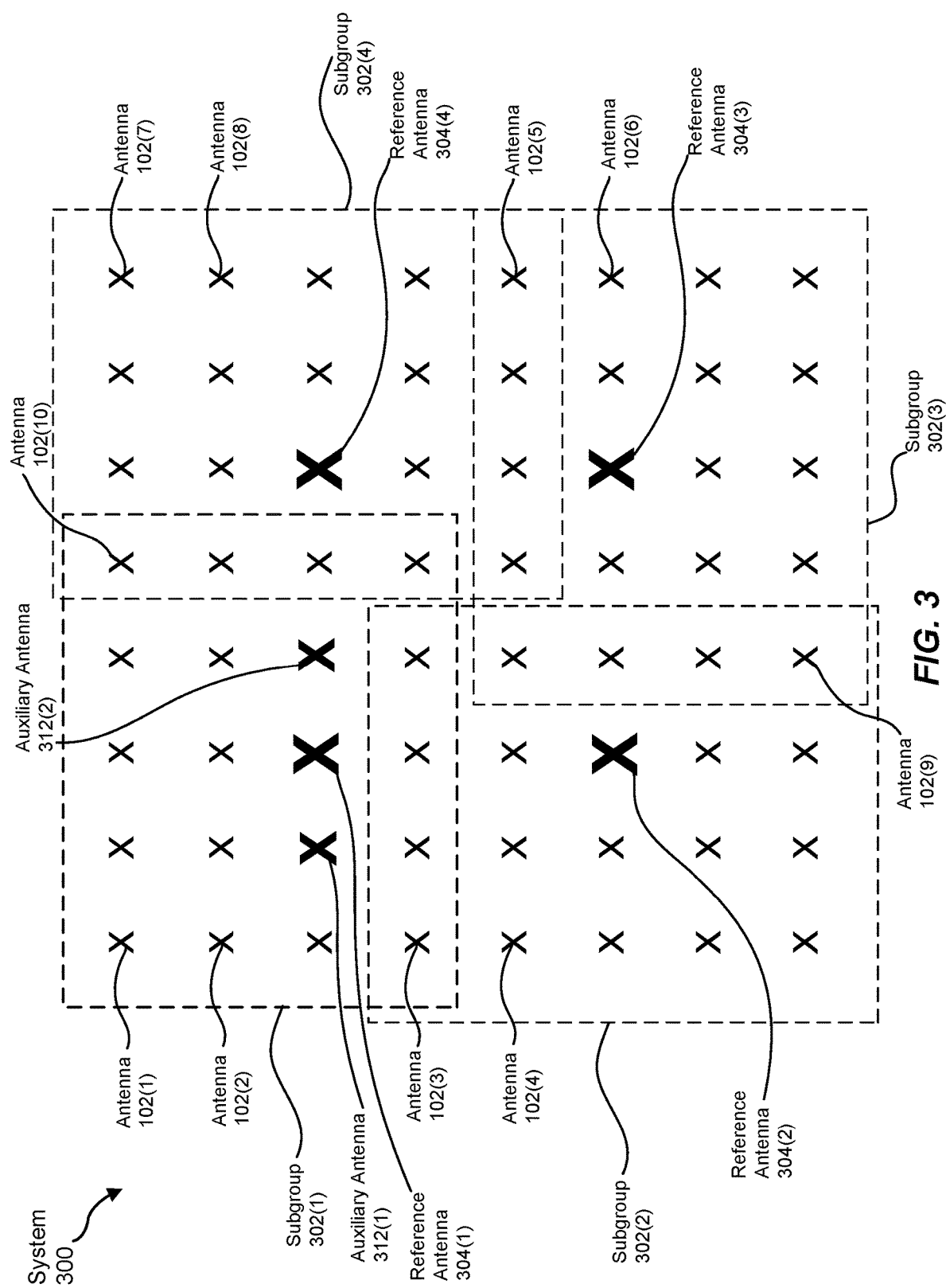
FIG. 3 is an illustration of an exemplary system for calibrating transceivers in beamforming antennas over the air without calibration circuitry according to one or more embodiments of this disclosure.

FIG. 3 illustrates an exemplary system 300 that includes various transceivers used to measure leakage from radio communications and then calibrate one another based at least in part on such leakage. In some examples, system 300 may include and/or represent all or a portion of a MaMIMO antenna. As illustrated in FIG. 3, exemplary system 300 may include and/or represent various subgroups of antennas and/or transceivers that calibrate to one another to synchronize the magnitude and/or phase of each beam pattern corresponding to such antennas and/or transceivers. In one example, the antennas illustrated in FIG. 3 may each have a certain polarization, and the grouping together of certain transceivers may be determined and/or informed by the polarization of those transceivers. As a specific example, each of the subgroups illustrated in FIG. 3 may include and/or represent antennas having the same polarization as one another but a different polarization relative to all the other subgroups.

In some examples, each of the antennas illustrated and/or labelled in FIG. 3 may be communicatively coupled to and/or incorporated in transceivers that are not necessarily illustrated and/or labelled in FIG. 3. In some examples, exemplary system 300 in FIG. 3 may illustrate and/or represent the physical locations and/or positions of the various antennas illustrated and/or labelled in FIG. 3 relative to one another. However, because these antennas are incorporated in and/or correspond to transceivers undergoing calibration, the terms "antennas" and/or "transceivers" may sometimes be used interchangeably in connection with FIG. 3.

As will be described in greater detail below, the calibration of one subgroup may be stitched, fused, applied, and/or imputed to one or more additional subgroups to effectively calibrate all the antennas and/or transceivers included in system 300 to one another. Unfortunately, because of the large scale and/or size of the antenna and/or transceiver group included in system 300, a single reference antenna may be unable to support calibration of all those antennas as the signal transmitted by the single reference antenna would be unable to reach all other antennas included in system 300 with the necessary magnitude (e.g., decibels) and/or intensity for calibration.

In some examples, exemplary system 300 may include and/or represent subgroups 302(1), 302(2), 302(3), and 302(4). In one example, subgroup 302(1) may include and/or represent a reference antenna 304(1) flanked by auxiliary antennas 312(1) and 312(2) toward a central region. In this example, reference antenna 304(1) may be non-overlapping as it is not shared in common with any of subgroups 302(2)-(4). In addition, subgroup 302(1) may include and/or represent various member antennas, such as antennas 102(1), 102(2), 102(3), and 102(10).

As illustrated in FIG. 3, antennas 102(1) and 102(2) may be isolated and/or unique to subgroup 302(1). In other words, antennas 102(1) and 102(2) may be included in only subgroup 302(1) and thus excluded from subgroups 302(2)-(4). Accordingly, antennas 102(1) and 102(2) may constitute and/or represent non-overlapping antennas because they do not overlap and/or are not shared by multiple subgroups.

In contrast, antenna 102(3) may overlap and/or be shared in common by subgroups 302(1) and 302(2). In other words, antenna 102(3) may be included in subgroups 302(1) and 302(2) but excluded from subgroups 302(3) and 302(4). Similarly, antenna 102(10) may overlap and/or be shared in common by subgroups 302(1) and 302(4). In other words, antenna 102(10) may be included in subgroups 302(1) and 302(4) but excluded from subgroups 302(2) and 302(3). Accordingly, antennas 102(3) and 102(10) may constitute and/or represent overlapping antennas because they overlap and/or are shared by multiple subgroups.

In one example, subgroup 302(2) may include and/or represent a reference antenna 304(2) flanked by auxiliary antennas (not necessarily labelled in FIG. 3) toward a central region. In this example, reference antenna 304(2) may be non-overlapping as it is not shared in common with any of subgroups 302(1), 302(3), or 302(4). In addition, subgroup 302(2) may include and/or represent various member transceivers, such as antennas 102(3), 102(4), and 102(9). As illustrated in FIG. 3, antenna 102(4) may be isolated and/or unique to subgroup 302(2). In other words, antenna 102(4) may be included in only subgroup 302(2) and thus excluded from subgroups 302(1), 302(3), and 302(4). Accordingly, antenna 102(4) may constitute and/or represent a non-overlapping transceiver because it does not overlap and/or is not shared by multiple subgroups.

In contrast, antenna 102(9) may overlap and/or be shared in common by subgroups 302(2) and 302(3). In other words, antenna 102(9) may be included in subgroups 302(2) and 302(3) but excluded from subgroups 302(1) and 302(4). Accordingly, antenna 102(9) may constitute and/or represent an overlapping transceiver because it overlaps and/or is shared by multiple subgroups.

In one example, subgroup 302(3) may include and/or represent a reference antenna 304(3) flanked by auxiliary transceivers (not necessarily labelled in FIG. 3) toward a central region. In this example, reference antenna 304(3) may be non-overlapping as it is not shared in common with any of subgroups 302(1), 302(2), or 302(4). In addition, subgroup 302(3) may include and/or represent various member transceivers, such as antennas 102(5), 102(6), and 102(9). As illustrated in FIG. 3, antenna 102(6) may be isolated and/or unique to subgroup 302(3). In other words, antenna 102(6) may be included in only subgroup 302(3) and thus excluded from subgroups 302(1), 302(2), and 302(4). Accordingly, antenna 102(6) may constitute and/or represent a non-overlapping transceiver because it does not overlap and/or is not shared by multiple subgroups.

In contrast, antenna 102(5) may overlap and/or be shared in common by subgroups 302(3) and 302(4). In other words, antenna 102(5) may be included in subgroups 302(3) and 302(4) but excluded from subgroups 302(1) and 302(2). Accordingly, antenna 102(5) may constitute and/or represent an overlapping transceiver because it overlaps and/or is shared by multiple subgroups.

In one example, subgroup 302(4) may include and/or represent a reference antenna 304(4) flanked by auxiliary transceivers (not necessarily labelled in FIG. 3) toward a central region. In this example, reference antenna 304(4) may be non-overlapping as it is not shared in common with any of subgroups 302(1)-(3). In addition, subgroup 302(4) may include and/or represent various member transceivers, such as antennas 102(5), 102(7), 102(8), and 102(10). As illustrated in FIG. 3, antennas 102(7) and 102(8) may be isolated and/or unique to subgroup 302(4). In other words, antennas 102(7) and 102(8) may be included in only subgroup 302(4) and thus excluded from subgroups 302(1)-(3). Accordingly, antennas 102(7) and 102(8) may constitute and/or represent non-overlapping transceivers because they do not overlap and/or are not shared by multiple subgroups.

In some examples, all the antennas and/or transceivers included in system 300 may be capable of being calibrated and/or synchronized (on the transmitter and/or receiver) over the air to improve beamforming in connection with a beamforming antenna. In one example, a controller may be communicatively coupled to the antennas and/or transceivers included in system 300. In this example, the controller may identify and/or determine subgroups 302(1)-(4) that include various antennas and/or transceivers capable of being calibrated and/or synchronized over the air. The controller may obtain leakage measurements taken in connection with signals emitted and/or transmitted by at least one antenna and/or transceiver included in each of subgroups. For example, the controller may obtain leakage measurements taken in connection with signals (e.g., radio signals) emitted and/or transmitted by the transmitter lines of member antennas and/or transceivers included and/or represented in subgroups 302(1)-(4). In this example, the leakage measurements may be taken by and/or made at the receiver lines of reference antennas 304(1)-(4) or the corresponding transceivers included and/or represented in subgroups 302(1)-(4).

In some examples, reference antenna 304(1) may detect, receive, and/or measure electromagnetic radiation leakage from signals emitted and/or transmitted by all the member antennas and/or transceivers included and/or represented in subgroup 302(1). In such examples, all those member antennas and/or transceivers (e.g., antennas 102(1)-(3) and 102

(10) as well as auxiliary antennas 312(1) and 312(2), etc.) included and/or represented in subgroup 302(1) may emit and/or transmit a signal that leaks electromagnetic radiation to reference antenna 304(1). In one example, each of those member antennas and/or transceivers may emit and/or transmit a signal in isolation from the other member antennas and/or transceivers such that only one is emitting and/or transmitting a signal at any given time. In this example, those member antennas and/or transceivers may emit and/or transmit signals sequentially and/or consecutively to enable the reference transceiver to identify each transmitting antenna and/or transceiver among subgroup 302(1) and/or its corresponding leakage measurement.

In an alternative example, some or all of those member antennas and/or transceivers included and/or represented in subgroup 302(1) may emit and/or transmit a signal concurrently and/or simultaneously at any given time. In this example, those member antennas and/or transceivers may emit and/or transmit signals of differing frequencies and/or wavelengths to enable the reference transceiver to identify each transmitting antenna and/or transceiver among subgroup 302(1) and/or its corresponding leakage measurement.

In some examples, the controller may identify the leakage measurements taken in connection with all those member antennas and/or transceivers (e.g., antennas 102(1)-(3) and 102(10) as well as auxiliary antennas 312(1) and 312(2), etc.) included and/or represented in subgroup 302(1). For example, those leakage measurements may constitute and/or represent the leakage spread and/or dispersed from the signal emitted and/or transmitted by the member antennas and/or transceivers to reference antenna 304(1). In this example, such leakage measurements may include and/or represent the amount of leakage that reached reference antenna 304(1) from the member antennas and/or transceivers.

In some examples, reference antenna 304(2) may detect, receive, and/or measure electromagnetic radiation leakage from signals emitted and/or transmitted by all the member antennas included and/or represented in subgroup 302(2). In such examples, all those member antennas (e.g., antennas 102(3), 102(4), and 102(9) as well as auxiliary antennas adjacent to reference antenna 304(2), etc.) included and/or represented in subgroup 302(2) may emit and/or transmit a signal that leaks electromagnetic radiation to reference antenna 304(2). In one example, each of those member antennas may emit and/or transmit a signal in isolation from the other member antennas such that only one is emitting and/or transmitting a signal at any given time. In this example, those member antennas may emit and/or transmit signals sequentially and/or consecutively to enable the reference transceiver to identify each transmitting antenna and/or transceiver among subgroup 302(2) and/or its corresponding leakage measurement.

In an alternative example, some or all of those member antennas included and/or represented in subgroup 302(2) may emit and/or transmit a signal concurrently and/or simultaneously at any given time. In this example, those member antennas may emit and/or transmit signals of differing frequency and/or wavelength to enable the reference transceiver to identify each transmitting antenna and/or transceiver among subgroup 302(2) and/or its corresponding leakage measurement.

In some examples, the controller may identify the leakage measurements taken in connection with all those member antennas (e.g., antennas 102(3), 102(4), and 102(9) as well as auxiliary antennas adjacent to reference antenna 304(2), etc.) included and/or represented in subgroup 302(2). For example, those leakage measurements may constitute and/or represent the leakage spread and/or dispersed from the signal emitted and/or transmitted by the member antennas to reference antenna 304(2). In this example, such leakage measurements may include and/or represent the amount of leakage that reached reference antenna 304(2) from the member antennas.

In some examples, reference antenna 304(3) may detect, receive, and/or measure electromagnetic radiation leakage from signals emitted and/or transmitted by all the member antennas included and/or represented in subgroup 302(3). In such examples, all those member antennas (e.g., antennas 102(5), 102(6), and 102(9) as well as auxiliary transceivers adjacent to reference antenna 304(3), etc.) included and/or represented in subgroup 302(3) may emit and/or transmit a signal that leaks electromagnetic radiation to reference antenna 304(3). In one example, each of those member antennas may emit and/or transmit a signal in isolation from the other member antennas such that only one is emitting and/or transmitting a signal at any given time. In this example, those member antennas may emit and/or transmit signals sequentially and/or consecutively to enable the reference transceiver to identify each transmitting antenna and/or transceiver among subgroup 302(3) and/or its corresponding leakage measurement.

In an alternative example, some or all of those member antennas included and/or represented in subgroup 302(3) may emit and/or transmit a signal concurrently and/or simultaneously at any given time. In this example, those member antennas may emit and/or transmit signals of differing frequency and/or wavelength to enable the reference transceiver to identify each transmitting transceiver among subgroup 302(3) and/or its corresponding leakage measurement.

In some examples, the controller may identify the leakage measurements taken in connection with all those member antennas and/or transceivers (e.g., antennas 102(5), 102(6), and 102(9) as well as auxiliary antennas adjacent to reference antenna 304(3), etc.) included and/or represented in subgroup 302(3). For example, those leakage measurements may constitute and/or represent the leakage spread and/or dispersed from the signal emitted and/or transmitted by the member antennas and/or transceivers to reference antenna 304(3). In this example, such leakage measurements may include and/or represent the amount of leakage that reached reference antenna 304(3) from the member antennas and/or transceivers.

In some examples, reference antenna 304(4) and/or the corresponding transceiver may detect, receive, and/or measure electromagnetic radiation leakage from signals emitted and/or transmitted by all the member antennas and/or transceivers included and/or represented in subgroup 302(4). In such examples, all those member antennas and/or transceivers (e.g., antennas 102(5), 102(7), 102(8), and 102(10) as well as auxiliary antennas adjacent to reference antenna 304(4), etc.) included and/or represented in subgroup 302(4) may emit and/or transmit a signal that leaks electromagnetic radiation to reference antenna 304(4). In one example, each of those member antennas and/or transceivers may emit and/or transmit a signal in isolation from the other member antennas and/or transceivers such that only one is emitting and/or transmitting a signal at any given time. In this example, those member antennas and/or transceivers may emit and/or transmit signals sequentially and/or consecutively to enable the reference transceiver to identify each transmitting antenna and/or transceiver among subgroup 302(4) and/or its corresponding leakage measurement.

In an alternative example, some or all of those member antennas and/or transceivers included and/or represented in subgroup 302(4) may emit and/or transmit a signal concurrently and/or simultaneously at any given time. In this example, those member antennas and/or transceivers may emit and/or transmit signals of differing frequency and/or wavelength to enable the reference transceiver to identify each transmitting antenna and/or transceiver among subgroup 302(4) and/or its corresponding leakage measurement.

In some examples, the controller may identify the leakage measurements taken in connection with all those member antennas and/or transceivers (e.g., antennas 102(5), 102(7), 102(8), and 102(10) as well as auxiliary antennas adjacent to reference antenna 304(4), etc.) included and/or represented in subgroup 302(4). For example, those leakage measurements may constitute and/or represent the leakage spread and/or dispersed from the signal emitted and/or transmitted by the member antennas and/or transceivers to reference antenna 304(4). In this example, such leakage measurements may include and/or represent the amount of leakage that reached reference antenna 304(4) from the member antennas and/or transceivers.

In some examples, the leakage measurements may constitute and/or represent differentials and/or deltas between the signal emitted and/or transmitted and the electromagnetic radiation leaked from that signal to another antenna and/or transceiver included in the same subgroup. For example, the controller may measure differentials between certain features of the signal emitted and/or transmitted by antenna 102(1) and those features of the corresponding leakage detected and/or received at reference antenna 304 (1). Additionally or alternatively, the controller may measure differentials between certain features of the signal emitted and/or transmitted by antenna 102(9) and those features of the corresponding leakage detected and/or received at reference antenna 304(2) and/or reference antenna 304(3).

In some examples, the controller may calibrate and/or synchronize all the transmitter lines of the member antennas and/or transceivers included in subgroup 302(1) with respect to at least one feature (such as phase and/or magnitude). For example, the controller may calibrate and/or synchronize all the transmitter lines of those member antennas and/or transceivers to the same phase of the beam pattern and/or leakage detected at the reference transceiver. Additionally or alternatively, the controller may calibrate and/or synchronize all the transmitter lines of those member antennas and/or transceivers to the same magnitude of the beam pattern and/or leakage detected at the reference antenna and/or transceiver. By doing so, this calibration and/or synchronization of the transmitter lines of those member antennas and/or transceivers included in subgroup 302(1) may improve, focus, and/or benefit the beamforming of system 300.

In some examples, the controller may calibrate and/or synchronize all the transmitter lines of the member antennas and/or transceivers included in subgroup 302(2) with respect to at least one feature (such as phase and/or magnitude). For example, the controller may calibrate and/or synchronize all the transmitter lines of those member antennas and/or transceivers to the same phase of the beam pattern and/or leakage detected at the reference antenna and/or transceiver. Additionally or alternatively, the controller may calibrate and/or synchronize all the transmitter lines of those member antennas and/or transceivers to the same magnitude of the beam pattern and/or leakage detected at the reference antenna and/or transceiver. By doing so, this calibration and/or synchronization of the transmitter lines of those member antennas and/or transceivers included in subgroup 302(2) may improve, focus, and/or benefit the beamforming of system 300.

As subgroups 302(1) and 302(2) include and/or represent various overlapping antennas and/or transceivers (e.g., antenna 102(3), etc.), the controller may be able to stitch, fuse, and/or blend the calibration and/or synchronization of subgroups 302(1) and 302(2) together based at least in part on the leakage measurements taken in connection with the overlapping antennas and/or transceivers. For example, the controller may align and/or synchronize the magnitude and/or phase of each beam pattern emitted by the transmitter lines of the member transceivers included and/or represented in subgroups 302(1) and 302(2) relative to the reference antennas and/or transceivers. Additionally or alternatively, the controller may modify the transmitter lines of those member transceivers by flattening the variation and/or deviation in the corresponding magnitude and/or phase of the transmitter lines to reach and/or achieve relative synchronicity across subgroups 302(1) and 302(2) based at least in part on the leakage measurements taken in connection with the overlapping antennas and/or transceivers.

In some examples, the controller may calibrate and/or synchronize all the transmitter lines of the member antennas and/or transceivers included in subgroup 302(3) with respect to at least one feature (such as phase and/or magnitude). For example, the controller may calibrate and/or synchronize all the transmitter lines of those member antennas and/or transceivers to the same phase of the beam pattern and/or leakage detected at the reference antenna and/or transceiver. Additionally or alternatively, the controller may calibrate and/or synchronize all the transmitter lines of those member antennas and/or transceivers to the same magnitude of the beam pattern and/or leakage detected at the reference antenna and/or transceiver. By doing so, this calibration and/or synchronization of the transmitter lines of those member antennas and/or transceivers included in subgroup 302(3) may improve, focus, and/or benefit the beamforming of system 300.

As subgroups 302(2) and 302(3) include and/or represent various overlapping antennas and/or transceivers (e.g., antenna 102(9), etc.), the controller may be able to stitch, fuse, and/or blend the calibration and/or synchronization of subgroups 302(2) and 302(3) together based at least in part on the leakage measurements taken in connection with the overlapping antennas and/or transceivers. For example, the controller may align and/or synchronize the magnitude and/or phase of each beam pattern emitted by the transmitter lines of the member antennas and/or transceivers included and/or represented in subgroups 302(2) and 302(3) relative to the reference antennas and/or transceivers. Additionally or alternatively, the controller may modify the transmitter lines of those member transceivers by flattening the variation and/or deviation in the corresponding magnitude and/or phase of the transmitter lines to reach and/or achieve relative synchronicity across subgroups 302(2) and 302(3) based at least in part on the leakage measurements taken in connection with the overlapping antennas and/or transceivers.

In some examples, the controller may calibrate and/or synchronize all the transmitter lines of the member antennas and/or transceivers included in subgroup 302(4) with respect to at least one feature (such as phase and/or magnitude). For example, the controller may calibrate and/or synchronize all the transmitter lines of those member transceivers to the same phase of the beam pattern and/or leakage detected at the reference transceiver. Additionally or alternatively, the controller may calibrate and/or synchronize all the transmitter lines of those member transceivers to the same magnitude of the beam pattern and/or leakage detected at the reference transceiver. By doing so, this calibration and/or synchronization of the transmitter lines of those member transceivers included in subgroup 302(4) may improve, focus, and/or benefit the beamforming of system 300.

As subgroups 302(3) and 302(4) include and/or represent various overlapping antennas and/or transceivers (e.g., antenna 102(5), etc.), the controller may be able to stitch, fuse, and/or blend the calibration and/or synchronization of subgroups 302(3) and 302(4) together based at least in part on the leakage measurements taken in connection with the overlapping antennas and/or transceivers. For example, the controller may align and/or synchronize the magnitude and/or phase of each beam pattern emitted by the transmitter lines of the member transceivers included and/or represented in subgroups 302(3) and 302(4) relative to the reference antennas and/or transceivers. Additionally or alternatively, the controller may modify the transmitter lines of those member antennas and/or transceivers by flattening the variation and/or deviation in the corresponding magnitude and/or phase of the transmitter lines to reach and/or achieve relative synchronicity across subgroups 302(3) and 302(4) based at least in part on the leakage measurements taken in connection with the overlapping antennas and/or transceivers.

In some examples, the controller may apply and/or implement a certain transmitter calibration formula. For example, the controller may calculate and/or compute the appropriate transmitter adjustment and/or reference point for each transmitter by $y_{rx1Ref} = x_{tx1} \times \alpha_{tx1} e^{j\Theta_{tx1}} (\alpha_{txAir1} e^{j\Theta_{txAir1}}) \times \alpha_{rxRef} e^{j\Theta_{rxRef}}$, where $y_{rx1Ref}$ represents the signal with a certain magnitude and/or phase received at the receiver line of the reference transceiver, $x_{tx1}$ represents the input signal with a certain magnitude and/or phase provided to the power amplifier module included in the transmitter line of the member transceiver, $\alpha_{tx1} e^{j\Theta_{tx1}}$ represents the transfer function of the transmitter line through which the input signal passes prior to transmission by the member transceiver, $\alpha_{txAir1} e^{j\Theta_{txAir1}}$ represents the transfer function of the air through which the transmitted signal passes prior to arriving at the reference transceiver, and $\alpha_{rxRef} e^{j\Theta_{rxRef}}$ represents the transfer function of the receiver line through which the received signal passes at the reference transceiver. The controller may then modify and/or adjust the $\alpha_{tx1} e^{j\Theta_{tx1}}$ feature of the transmitter line in the member transceiver to align with and/or match a specific reference and/or value for calibration purposes.

As another example, the controller may obtain leakage measurements taken in connection with signals (e.g., radio signals) emitted and/or transmitted by the transmitter lines of the reference transceivers. In this example, the leakage measurements may be taken by and/or made at the receiver lines of some or all of the member transceivers included and/or represented in subgroups 302(1)-(4).

In some examples, reference antenna 304(1) may emit and/or transmit a signal that leaks electromagnetic radiation to all the member antennas (such as antennas 102(1)-(3) and 102(10) as well as auxiliary antennas 312(1) and 312(2), etc.) included and/or represented in subgroup 302(1). In one example, all those member transceivers may detect, receive, and/or measure leakage from the signal emitted and/or transmitted by reference antenna 304(1). For example, the leakage detected, received, and/or measured by all those member transceivers may range from between 15 decibels and 40 decibels. Alternatively, the leakage detected, received, and/or measured by all those member transceivers may range from between 15 decibels and 70 decibels.

In some examples, the controller may identify the leakage measurements taken in connection with all those other transceivers included and/or represented in subgroup 302(1). For example, those leakage measurements may constitute and/or represent the leakage spread and/or dispersed from the signal emitted and/or transmitted by reference antenna 304(1) to all the other antennas included and/or represented in subgroup 302(1). In this example, such leakage measurements may include and/or represent the amount of leakage that reached antennas 102(1)-(3) and 102(10) from reference antenna 304(1). In one example, such leakage measurements may also include and/or represent the amount of leakage that reached auxiliary antennas 312(1) and 312(2) from reference antenna 304(1).

In some examples, reference antenna 304(2) may emit and/or transmit a signal that leaks electromagnetic radiation to all the member antennas (such as antennas 102(3), 102(4), and 102(9) as well as auxiliary antennas adjacent to reference antenna 304(2), etc.) included and/or represented in subgroup 302(2). In one example, all those member transceivers may detect, receive, and/or measure leakage from the signal emitted and/or transmitted by reference antenna 304(2). For example, the leakage detected, received, and/or measured by all those member transceivers may range from between 15 decibels and 40 decibels. Alternatively, the leakage detected, received, and/or measured by all those member transceivers may range from between 15 decibels and 70 decibels.

In some examples, the controller may identify the leakage measurements taken in connection with all those other transceivers included and/or represented in subgroup 302(2). For example, those leakage measurements may constitute and/or represent the leakage spread and/or dispersed from the signal emitted and/or transmitted by reference antenna 304(2) to all the other transceivers included and/or represented in subgroup 302(2). In this example, such leakage measurements may include and/or represent the amount of leakage that reached antennas 102(3), 102(4), and 102(9) from reference antenna 304(2). In one example, such leakage measurements may also include and/or represent the amount of leakage that reached auxiliary transceivers adjacent to reference antenna 304(2).

In some examples, reference antenna 304(3) may emit and/or transmit a signal that leaks electromagnetic radiation to all the member antennas (such as antennas 102(5), 102(6), and 102(9) as well as auxiliary antennas adjacent to reference antenna 304(3), etc.) included and/or represented in subgroup 302(3). In one example, all those member transceivers may detect, receive, and/or measure leakage from the signal emitted and/or transmitted by reference antenna 304(3). For example, the leakage detected, received, and/or measured by all those member transceivers may range from between 15 decibels and 40 decibels. Alternatively, the leakage detected, received, and/or measured by all those member transceivers may range from between 15 decibels and 70 decibels.

In some examples, the controller may identify the leakage measurements taken in connection with all those other transceivers included and/or represented in subgroup 302(3). For example, those leakage measurements may constitute and/or represent the leakage spread and/or dispersed from the signal emitted and/or transmitted by reference antenna 304(3) to all the other transceivers included and/or represented in subgroup 302(3). In this example, such leakage measurements may include and/or represent the amount of leakage that reached antennas 102(5), 102(6), and 102(9) from reference antenna 304(3). In one example, such leakage measurements may also include and/or represent the amount of leakage that reached auxiliary transceivers adjacent to reference antenna 304(3).

In some examples, reference antenna 304(4) may emit and/or transmit a signal that leaks electromagnetic radiation to all the member antennas (such as antennas 102(5), 102(7), 102(8), and 102(10) as well as auxiliary antennas adjacent to reference antenna 304(4), etc.) included and/or represented in subgroup 302(4). In one example, all those member transceivers may detect, receive, and/or measure leakage from the signal emitted and/or transmitted by reference antenna 304(4). For example, the leakage detected, received, and/or measured by all those member transceivers may range from between 15 decibels and 40 decibels. Alternatively, the leakage detected, received, and/or measured by all those member transceivers may range from between 15 decibels and 70 decibels.

In some examples, the controller may identify the leakage measurements taken in connection with all those other transceivers included and/or represented in subgroup 302(4). For example, those leakage measurements may constitute and/or represent the leakage spread and/or dispersed from the signal emitted and/or transmitted by reference antenna 304(3) to all the other transceivers included and/or represented in subgroup 302(4). In this example, such leakage measurements may include and/or represent the amount of leakage that reached antennas 102(5), 102(7), 102(8), and 102(10) from reference antenna 304(4). In one example, such leakage measurements may also include and/or represent the amount of leakage that reached auxiliary transceivers adjacent to reference antenna 304(4).

As mentioned above, the leakage measurements may constitute and/or represent differentials and/or deltas between the signal emitted and/or transmitted and the electromagnetic radiation leaked from that signal to another antenna and/or transceiver included in the same subgroup. For example, the controller may measure differentials between certain features of the signal emitted and/or transmitted by reference antenna 304(1) and those features of the corresponding leakage detected and/or received at antenna 102(1). Additionally or alternatively, the controller may measure differentials between certain features of the signal emitted and/or transmitted by reference antenna 304(2) or reference antenna 304(3) and those features of the corresponding leakage detected and/or received at antenna 102(9).

In some examples, the controller may calibrate and/or synchronize all the receiver lines of the member antennas and/or transceivers included in subgroup 302(1) with respect to at least one feature (such as phase and/or magnitude). For example, the controller may calibrate and/or synchronize all the receiver lines of the member antennas and/or transceivers included in subgroup 302(1) to the same phase of the beam pattern and/or leakage detected at one of those member antennas and/or transceivers. Additionally or alternatively, the controller may calibrate and/or synchronize all the receiver lines of the member antennas and/or transceivers included in subgroup 302(1) to the same magnitude of the beam pattern and/or leakage detected at one of those member antennas and/or transceivers. By doing so, this calibration and/or synchronization of the receiver lines of those antennas and/or transceivers included in subgroup 302(1) may improve, focus, and/or benefit the beamforming of system 300.

In some examples, the controller may calibrate and/or synchronize all the receiver lines of the member antennas and/or transceivers included in subgroup 302(2) with respect to at least one feature (such as phase and/or magnitude). For example, the controller may calibrate and/or synchronize all the receiver lines of the member antennas and/or transceivers included in subgroup 302(2) to the same phase of the beam pattern and/or leakage detected at one of those member antennas and/or transceivers. Additionally or alternatively, the controller may calibrate and/or synchronize all the receiver lines of the member antennas and/or transceivers included in subgroup 302(2) to the same magnitude of the beam pattern and/or leakage detected at one of those member antennas and/or transceivers. By doing so, this calibration and/or synchronization of the receiver lines of those antennas and/or transceivers included in subgroup 302(2) may improve, focus, and/or benefit the beamforming of system 300.

As subgroups 302(1) and 302(2) include and/or represent various overlapping antennas and/or transceivers (e.g., antenna 102(3), etc.), the controller may be able to stitch, fuse, and/or blend the calibration and/or synchronization of subgroups 302(1) and 302(2) together based at least in part on the leakage measurements taken in connection with the overlapping antennas and/or transceivers. For example, the controller may align and/or synchronize the magnitude and/or phase of each beam pattern detected and/or received by the receiver lines of the member transceivers included and/or represented in subgroups 302(1) and 302(2) relative to the reference transceivers. Additionally or alternatively, the controller may modify the receiver lines of those member transceivers by flattening the variation and/or deviation in the corresponding magnitude and/or phase of the receiver lines to reach and/or achieve relative synchronicity across subgroups 302(1) and 302(2) based at least in part on the leakage measurements taken in connection with the overlapping antennas and/or transceivers.

In some examples, the controller may calibrate and/or synchronize all the receiver lines of the member antennas and/or transceivers included in subgroup 302(3) with respect to at least one feature (such as phase and/or magnitude). For example, the controller may calibrate and/or synchronize all the receiver lines of the member antennas and/or transceivers included in subgroup 302(3) to the same phase of the beam pattern and/or leakage detected at one of those member antennas and/or transceivers. Additionally or alternatively, the controller may calibrate and/or synchronize all the receiver lines of the member antennas and/or transceivers included in subgroup 302(3) to the same magnitude of the beam pattern and/or leakage detected at one of those member antennas and/or transceivers. By doing so, this calibration and/or synchronization of the receiver lines of those antennas and/or transceivers included in subgroup 302(3) may improve, focus, and/or benefit the beamforming of system 300.

As subgroups 302(2) and 302(3) include and/or represent various overlapping antennas and/or transceivers (e.g., antenna 102(9), etc.), the controller may be able to stitch, fuse, and/or blend the calibration and/or synchronization of subgroups 302(2) and 302(3) together based at least in part on the leakage measurements taken in connection with the overlapping antennas and/or transceivers. For example, the controller may align and/or synchronize the magnitude and/or phase of each beam pattern detected and/or received by the receiver lines of the member antennas and/or transceivers included and/or represented in subgroups 302(2) and 302(3) relative to the reference antennas and/or transceivers.

Additionally or alternatively, the controller may modify the receiver lines of those member transceivers by flattening the variation and/or deviation in the corresponding magnitude and/or phase of the receiver lines to reach and/or achieve relative synchronicity across subgroups 302(2) and 302(3) based at least in part on the leakage measurements taken in connection with the overlapping antennas and/or transceivers.

In some examples, the controller may calibrate and/or synchronize all the receiver lines of the member antennas and/or transceivers included in subgroup 302(4) with respect to at least one feature (such as phase and/or magnitude). For example, the controller may calibrate and/or synchronize all the receiver lines of the member antennas and/or transceivers included in subgroup 302(4) to the same phase of the beam pattern and/or leakage detected at one of those member antennas and/or transceivers. Additionally or alternatively, the controller may calibrate and/or synchronize all the receiver lines of the member antennas and/or transceivers included in subgroup 302(4) to the same magnitude of the beam pattern and/or leakage detected at one of those member antennas and/or transceivers. By doing so, this calibration and/or synchronization of the receiver lines of those antennas and/or transceivers included in subgroup 302(4) may improve, focus, and/or benefit the beamforming of system 300.

As subgroups 302(3) and 302(4) include and/or represent various overlapping antennas and/or transceivers (e.g., antenna 102(5), etc.), the controller may be able to stitch, fuse, and/or blend the calibration and/or synchronization of subgroups 302(3) and 302(4) together based at least in part on the leakage measurements taken in connection with the overlapping antennas and/or transceivers. For example, the controller may align and/or synchronize the magnitude and/or phase of each beam pattern detected and/or received by the receiver lines of the member antennas and/or transceivers included and/or represented in subgroups 302(3) and 302(4) relative to the reference antennas and/or transceivers. Additionally or alternatively, the controller may modify the receiver lines of those member transceivers by flattening the variation and/or deviation in the corresponding magnitude and/or phase of the receiver lines to reach and/or achieve relative synchronicity across subgroups 302(3) and 302(4) based at least in part on the leakage measurements taken in connection with the overlapping antennas and/or transceivers.

Additionally or alternatively, as subgroups 302(4) and 302(1) include and/or represent various overlapping antennas and/or transceivers (e.g., antenna 102(10), etc.), the controller may be able to stitch, fuse, and/or blend the calibration and/or synchronization of subgroups 302(4) and 302(1) together based at least in part on the leakage measurements taken in connection with the overlapping antennas and/or transceivers. Accordingly, by linking each subgroup within system 300 to one another via the leakage measurements of overlapping antennas and/or transceivers, the controller may effectively complete and/or close the loop on the calibration and/or synchronization process across all the member antennas and/or transceivers included in system 300 despite multiple subgroups and/or reference antennas and/or transceivers. In some examples, the controller may obtain and/or take transmit leakage measurements and the receive leakage measurements for any given antenna together and/or substantially simultaneously. As a specific example, the controller may obtain and/or take both transmit and receive leakage measurements for antenna 100(1) before moving on to obtain and/or take transmit or receive leakage measurements for antenna 100(2) or vice versa. Upon obtaining and/or taking the transmit and receive leakage measurements for any given antenna, the controller may determine and/or compute the transmit-to-receive leakage ratio for that antenna based at least in part on those transmit and receive leakage measurements. The controller may then be able to remove and/or account for the effect of air interference on those transmit and receive leakage measurements. For example, the controller may divide the transmit leakage measurement by the receive leakage measurement for each member transceiver with reference to the corresponding reference antennas. By doing so, the controller may be able to remove the effect of air interference from the transmit and receive leakage measurements.

In some examples, the controller may apply and/or implement a certain receiver calibration formula. For example, the controller may calculate and/or compute the appropriate receiver adjustment and/or reference point for each receiver by $y_{rx1} = x_{txRef} \times \alpha_{txRef} e^{j\theta_{txRef}} (\alpha_{txAir1} e^{j\theta_{txAir1}}) \times \alpha_{rx1} e^{j\theta_{rx1}}$, where $y_{rx1}$ represents the signal with a certain magnitude and/or phase received at the receiver line of the member transceiver, $x_{txRef}$ represents the input signal with a certain magnitude and/or phase provided to the power amplifier module included in the transmitter line of the reference transceiver, $\alpha_{txRe\theta} e^{j\theta_{txRe\theta}}$ represents the transfer function of the transmitter line through which the input signal passes prior to transmission by the reference transceiver, $\alpha_{txAir1} e^{j\theta_{txAir1}}$ represents the transfer function of the air through which the transmitted signal passes prior to arriving at the reference transceiver, and $\alpha_{rx1} e^{j\theta_{rx1}}$ represents the transfer function of the receiver line through which the received signal passes at the member transceiver. The controller may then modify and/or adjust the $\alpha_{rx1} e^{j\theta_{rx1}}$ feature of the receiver line in the member transceiver to align with and/or match a specific reference and/or value for calibration purposes.

In some examples, the controller may need to calibrate reference transceivers 202(1)-(4) as well to achieve optical beamforming performance and/or improvement. In one example, the controller may be able to calibrate reference transceivers 202(1)-(4) using leakage measurements involving auxiliary antennas 312(1) and 312(2). For example, auxiliary antenna 312(1) may emit and/or transmit auxiliary signals that leak electromagnetic radiation toward reference transceiver 202(1) and/or auxiliary antenna 312(2). In this example, reference transceiver 202(1) may detect, receive, and/or measure the leakage from the auxiliary signals transmitted by auxiliary antenna 312(1). Additionally or alternatively, auxiliary antenna 312(2) may detect, receive, and/or measure the leakage from the auxiliary signals transmitted by auxiliary antenna 312(1).

In some examples, the controller may measure an auxiliary differential and/or delta between the auxiliary signals transmitted by auxiliary antenna 312(1) and the leakage from the auxiliary signals received by reference transceiver 202(1). Additionally or alternatively, the controller may measure an auxiliary differential and/or delta between the auxiliary signals transmitted by auxiliary antenna 312(1) and the leakage from the auxiliary signals received by auxiliary antenna 312(2). In such examples, the controller may calibrate and/or synchronize the receiver line of the reference antenna 304(1) with respect to at least one feature (such as phase and/or magnitude) based at least in part on the auxiliary differential(s) and/or delta(s) between the auxiliary signals transmitted by auxiliary antenna 312(1) and the leakage from the auxiliary signals received by reference transceiver 202(1) and/or auxiliary antenna 312(2). For example, the controller may calibrate and/or synchronize the receiver line of reference transceiver 202(1) to the same phase and/or magnitude of the beam pattern and/or leakage detected at auxiliary antenna 312(2).

Similar and/or identical techniques for calibrating the receiver lines of reference transceivers 202(2)-(4) may be implemented across system 300. For example, one auxiliary transceiver adjacent to reference transceiver 202(2) in subgroup 302(2) may emit and/or transmit auxiliary signals that leak electromagnetic radiation toward reference transceiver 202(2) and/or another auxiliary transceiver adjacent to reference transceiver 202(2). In this example, reference transceiver 202(2) may detect, receive, and/or measure the leakage from the auxiliary signals transmitted by the auxiliary transceiver. Additionally or alternatively, the other auxiliary transceiver may detect, receive, and/or measure the leakage from the auxiliary signals transmitted by auxiliary transceiver.

In some examples, the controller may measure an auxiliary differential and/or delta between the auxiliary signals transmitted by the auxiliary transceiver and the leakage from the auxiliary signals received by reference transceiver 202 (2). Additionally or alternatively, the controller may measure an auxiliary differential and/or delta between the auxiliary signals transmitted by the auxiliary transceiver and the leakage from the auxiliary signals received by the other auxiliary transceiver. In such examples, the controller may calibrate and/or synchronize the receiver line of the reference transceiver 202(2) with respect to at least one feature (such as phase and/or magnitude) based at least in part on the auxiliary differential(s) and/or delta(s) between the auxiliary signals transmitted by the auxiliary transceiver and the leakage from the auxiliary signals received by reference transceiver 202(2) and/or the other auxiliary transceiver. For example, the controller may calibrate and/or synchronize the receiver line of reference transceiver 202(2) to the same phase and/or magnitude of the beam pattern and/or leakage detected at the other auxiliary transceiver.

As another example, reference transceiver 202(1) may emit and/or transmit auxiliary signals that leak electromagnetic radiation toward auxiliary transceivers 312(1) and 312(2). In this example, auxiliary antenna 312(1) may detect, receive, and/or measure the leakage from the auxiliary signals transmitted by reference transceiver 202(1). Additionally or alternatively, auxiliary antenna 312(2) may detect, receive, and/or measure the leakage from the auxiliary signals transmitted by reference transceiver 202(1).

In some examples, the controller may measure an auxiliary differential and/or delta between the auxiliary signals transmitted by reference transceiver 202(1) and the leakage from the auxiliary signals received by auxiliary antenna 312(1). Additionally or alternatively, the controller may measure an auxiliary differential and/or delta between the auxiliary signals transmitted by reference transceiver 202(1) and the leakage from the auxiliary signals received by auxiliary antenna 312(2). In such examples, the controller may calibrate and/or synchronize the transmitter line of reference transceiver 202(1) with respect to at least one feature (such as phase and/or magnitude) based at least in part on the auxiliary differential(s) and/or delta(s) between the auxiliary signals transmitted by reference transceiver 202(1) and the leakage from the auxiliary signals received by auxiliary antenna 312(1) and/or auxiliary antenna 312(2). For example, the controller may calibrate and/or synchronize the transmitter line of reference transceiver 202(1) to the same phase and/or magnitude of the beam pattern and/or leakage as the member transceivers included in subgroup 302(1).

Similar and/or identical techniques for calibrating the transmitter lines of reference transceivers 202(2)-(4) may be implemented across system 300. For example, reference transceiver 202(2) may emit and/or transmit auxiliary signals that leak electromagnetic radiation toward auxiliary transceivers adjacent to reference transceiver 202(2). In this example, the auxiliary transceivers adjacent to reference transceiver 202(2) may detect, receive, and/or measure the leakage from the auxiliary signals transmitted by reference transceiver 202(2).

In some examples, the controller may measure an auxiliary differential(s) and/or delta(s) between the auxiliary signals transmitted by the reference transceiver 202(2) and the leakage from the auxiliary signals received by one or more of the auxiliary transceivers adjacent to reference transceiver 202(2). In such examples, the controller may calibrate and/or synchronize the transmitter line of reference transceiver 202(2) with respect to at least one feature (such as phase and/or magnitude) based at least in part on the auxiliary differential(s) and/or delta(s) between the auxiliary signals transmitted by the reference transceiver 202(2) and the leakage from the auxiliary signals received by one or more of the auxiliary transceivers adjacent to reference transceiver 202(2). For example, the controller may calibrate and/or synchronize the transmitter line of reference transceiver 202(2) to the same phase and/or magnitude of the beam pattern and/or leakage as the member transceivers included in subgroup 302(2).

The various techniques described above may be implemented and/or applied in different orders to achieve proper calibration of the transceivers included in system 300. In some examples, a calibration process may include and/or represent various stages. For example, the first stage of a calibration process may involve measuring the calibration data of all the member transceivers included in each partially overlapping subgroup of system 300 relative to the corresponding reference transceiver. In this example, the second stage of the calibration process may involve measuring the calibration data of each reference transceiver included in the partially overlapping subgroups of system 300 via two auxiliary transceivers adjacent to the corresponding reference transceiver. One of the auxiliary transceivers included in each partially overlapping subgroup may serve and/or function as a reference during the second stage while the other auxiliary transceiver may serve and/or function as the joining and/or linking point for combining the second stage data with the first stage data. Continuing with this example, the third stage of the calibration process may involve combining the first stage data and the second stage data for each partially overlapping subgroup using a common auxiliary transceiver as a reference data anchor for the purpose of measurement data aggregation. Finally, the fourth stage of the calibration process may involve combining the aggregate measurement data across all the partially overlapping subgroups to calibrate and/or synchronize the phase and/or magnitude of the transmitter and receiver lines of all the transceivers included in system 300.

Figure 5:
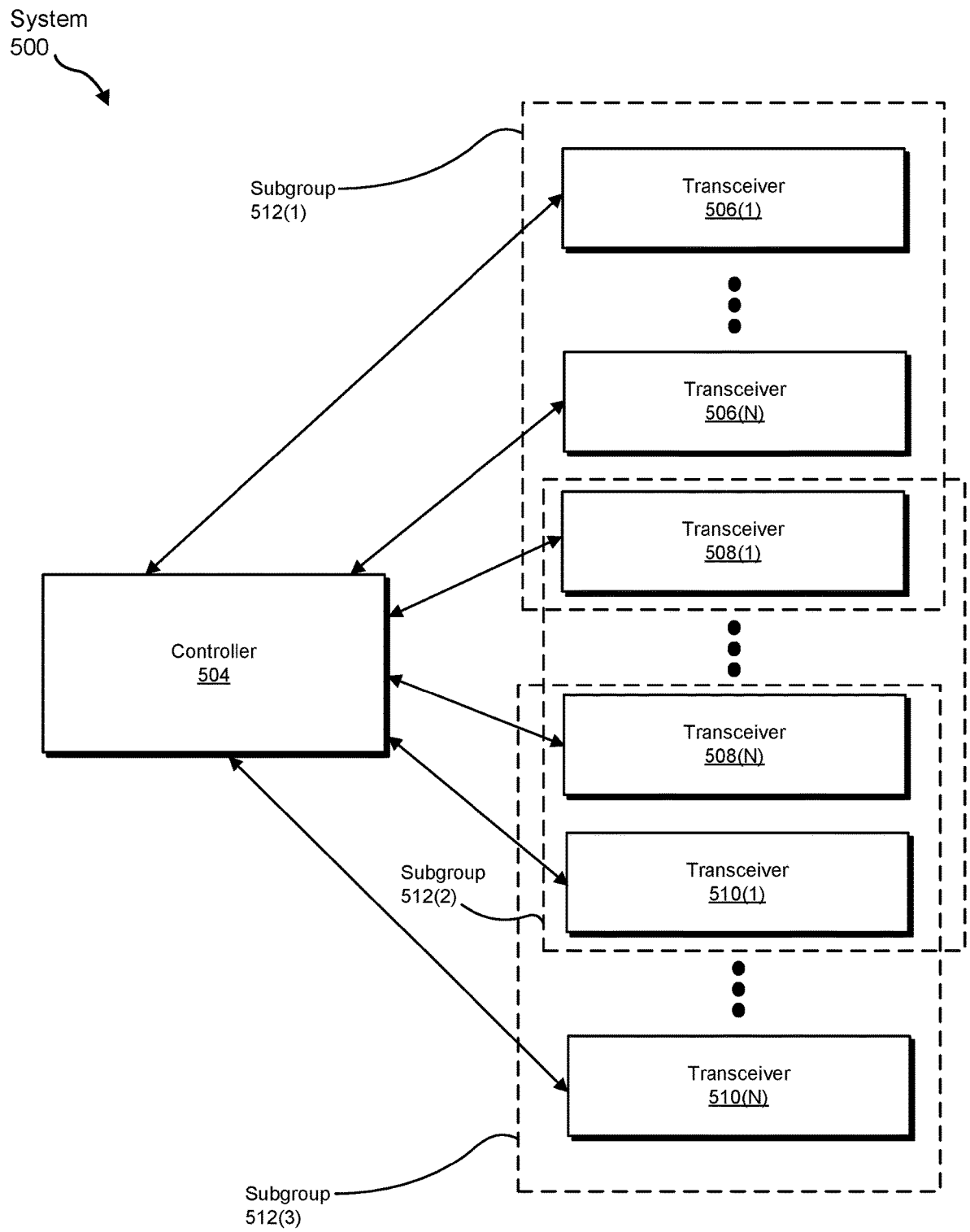
FIG. 5 is an illustration of an exemplary system for calibrating transceivers in beamforming antennas over the air without calibration circuitry according to one or more embodiments of this disclosure.

FIG. 5 illustrates an exemplary system 500 that includes and/or represents a controller 504 communicatively coupled to transceivers 506(1)-(N), 508(1)-(N), and 510(1)-(N). As illustrated in FIG. 5, the various transceivers included in system 500 may be included and/or represented in certain partially overlapping subgroups. For example, system 500 may include and/or represent a subgroup 512(1) comprised of at least transceivers 506(1)-(N) and transceiver 508(1). In this example, system 500 may also include and/or represent a subgroup 512(2) comprised of at least transceivers 508(1)-(N) and transceiver 510(1). Additionally or alternatively, system 500 may also include and/or represent a subgroup 512(3) comprised of at least transceivers 510(1)-(N) and transceiver 508(N).

In some examples, controller 504 may include and/or represent any type or form of hardware-implemented processing device capable of interpreting and/or executing computer-readable instructions. In one example, controller 504 may access and/or modify one or more of processes stored in memory. Additionally or alternatively, controller 504 may execute one or more processes to facilitate calibrating transceivers 506(1)-(N), 508(1)-(N), and 510(1)-(N) over the air without calibration circuitry. Examples of controller 504 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable controller.

In some examples, system 500 may include and/or represent one or more additional components that are necessarily illustrated in FIG. 5. For example, system 500 may also include and/or represent at least one memory device. Such a memory device may include and/or represent any type or form of volatile or non-volatile storage device or medium capable of storing data and/or computer-readable instructions. In one example, such a memory device may store, load, and/or maintain one or more of software and/or firmware modules or processes. Examples of such a memory device include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some examples, controller 504 and/or the transceivers may include sensors that measure the magnitude and/or phase of leakage detected and/or received at the transceivers. In one example, controller 504 may identify subgroups 512(1)-(3) that each include some of transceivers 506(1)-(N), 508(1)-(N), and 510(1)-(N). In this example, controller 504 may obtain leakage measurements in connection with signals emitted by at least one transceiver (whether a member transceiver or reference transceiver) included in each of subgroups 512(1)-(3).

Continuing with this example, controller 504 may identify, within the leakage measurements, a subset of leakage measurements taken in connection with at least one overlapping transceiver and multiple non-overlapping transceivers included in subgroups 512(1)-(3). Controller 504 may then calibrate some or all of transceivers 506(1)-(N), 508(1)-(N), and 510(1)-(N) with respect to at least one feature based at least in part on the subset of leakage measurements. As a result of this calibration, the beamforming provided by transceivers 506(1)-(N), 508(1)-(N), and 510(1)-(N) may improve for system 500.

Figure 6:
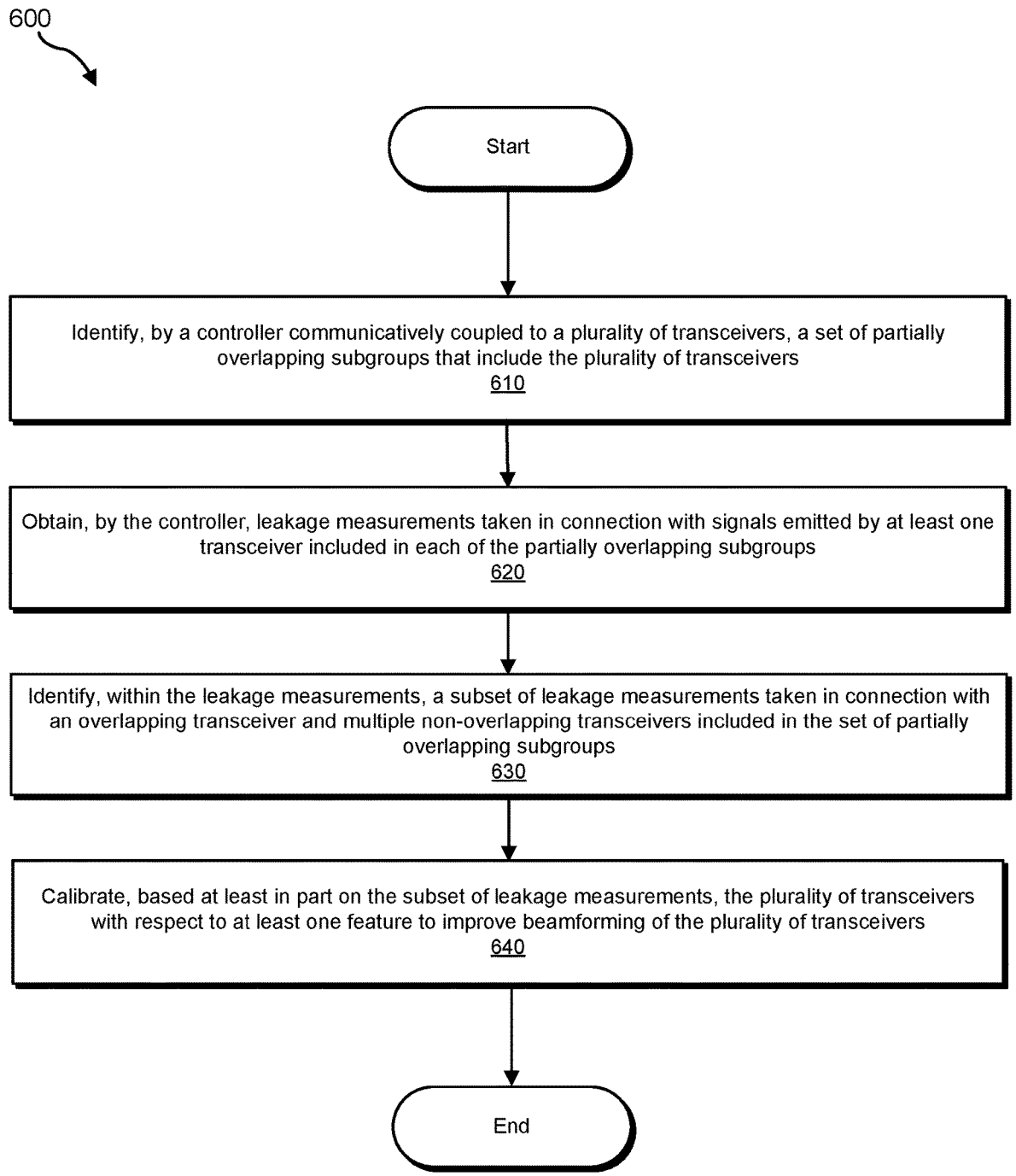
FIG. 6 is a flowchart of an exemplary method for calibrating transceivers in beamforming antennas over the air without calibration circuitry according to one or more embodiments of this disclosure.

FIG. 6 is a flow diagram of an exemplary method 600 for calibrating transceivers in beamforming antennas over the air without calibration circuitry. In one example, the steps shown in FIG. 6 may be performed during operation of a beamforming antenna. Additionally or alternatively, the steps shown in FIG. 6 may also incorporate and/or involve various sub-steps and/or variations consistent with the descriptions provided above in connection with FIGS. 1-5.

As illustrated in FIG. 6, method 600 may include and/or involve the step of identifying a set of partially overlapping subgroups that include the plurality of transceivers (610). Step 610 may be performed in a variety of ways, including any of those described above in connection with FIGS. 1-5. For example, a controller communicatively coupled to multiple transceivers may identify a set of partially overlapping subgroups that include the transceivers.

Method 600 may also include the step of obtaining leakage measurements taken in connection with signals emitted by at least one transceiver included in each of the partially overlapping subgroups (620). Step 620 may be performed in a variety of ways, including any of those described above in connection with FIGS. 1-5. For example, the controller may obtain leakage measurements taken in connection with signals emitted by at least one transceiver included in each of the partially overlapping subgroups. In one example, the controller may make and/or take the leakage measurements. Additionally or alternatively, the controller may receive the leakage measurements from the transceivers included in the partially overlapping subgroups.

Method 600 may also include the step of identifying, within the leakage measurements, a subset of leakage measurements taken in connection with an overlapping transceiver and multiple non-overlapping transceivers included in the set of partially overlapping subgroups (630). Step 630 may be performed in a variety of ways, including any of those described above in connection with FIGS. 1-5. For example, the controller may identify, within the leakage measurements, a subset of leakage measurements taken in connection with an overlapping transceiver and multiple non-overlapping transceivers included in the set of partially overlapping subgroups.

Method 600 may also include the step of calibrating, based at least in part on the subset of leakage measurements, the plurality of transceivers with respect to at least one feature to improve beamforming (640). Step 640 may be performed in a variety of ways, including any of those described above in connection with FIGS. 1-5. For example, the controller may calibrate, based at least in part on the subset of leakage measurements, the plurality of transceivers with respect to at least one feature to improve beamforming.

Example Embodiments

Example 1: An antenna system comprising (1) a plurality of transceivers capable of being calibrated over the air to improve beamforming and (2) at least one controller communicatively coupled to the plurality of transceivers, wherein the controller (A) identifies a set of partially overlapping subgroups that include the plurality of transceivers, (B) obtains leakage measurements taken in connection with signals emitted by at least one transceiver included in each of the partially overlapping subgroups, (C) identifies, within the leakage measurements, a subset of leakage measurements taken in connection with an overlapping transceiver and multiple non-overlapping transceivers included in the set of partially overlapping subgroups, and (D) calibrates, based at least in part on the subset of leakage measurements, the plurality of transceivers with respect to at least one feature to improve beamforming.

Example 2: The antenna system of Example 1, wherein the controller (1) obtains a first set of leakage measurements taken in connection with first signals emitted by at least one transceiver included in a first partially overlapping subgroup within the set of partially overlapping subgroups, (2) obtains a second set of leakage measurements taken in connection with second signals emitted by at least one transceiver included in a second partially overlapping subgroup within the set of partially overlapping subgroups, (3) identifies, within the first set of leakage measurements, a first leakage measurement taken in connection with a non-overlapping transceiver included in the first partially overlapping subgroup and at least one overlapping transceiver included in both the first partially overlapping subgroup and the second partially overlapping subgroup, (4) identifies, within the second set of leakage measurements, a second leakage measurement taken in connection with the non-overlapping transceiver included in the second partially overlapping subgroup and the overlapping transceiver included in both the first partially overlapping subgroup and the second partially overlapping subgroup, and (5) calibrates, based at least in part on the first and second leakage measurements, the plurality of transceivers with respect to the feature to improve beamforming.

Example 3: The antenna system of Example 1 or 2, wherein (1) the non-overlapping transceiver included in the first partially overlapping subgroup comprises a first reference transceiver that transmits the first signal, and (2) the non-overlapping transceiver included in the second partially overlapping subgroup comprises a second reference transceiver that transmits the second signals.

Example 4: The antenna system of any of Examples 1-3, wherein (1) the first partially overlapping subgroup comprises a first set of member transceivers that receive leakage from the first signals transmitted by the first reference transceiver, and (2) the second partially overlapping subgroup comprises a second set of member transceivers that receive leakage from the second signals transmitted by the second reference transceiver.

Example 5: The antenna system of any of Examples 1-4, wherein (1) measures a first set of differentials between the first signals transmitted by the first reference transceiver and the leakage received by the first set of member transceivers, (2) measures a second set of differentials between the second signals transmitted by the second reference transceiver and the leakage received by the second set of member transceivers, and (3) calibrates, based at least in part on the first and second sets of differentials, the plurality of transceivers with respect to the feature to improve beamforming.

Example 6: The antenna system of any of Examples 1-5, wherein (1) the first reference transceiver is positioned toward a central region of the first partially overlapping group to ensure that the leakage from the first signals reaches all of the first set of member transceivers above a certain energy threshold, and (2) the second reference transceiver is positioned toward a central region of the second partially overlapping group to ensure that the leakage from the second signals reaches all of the second set of member transceivers above the certain energy threshold.

Example 7: The antenna system of any of Examples 1-6, wherein (1) the non-overlapping transceiver included in the first partially overlapping subgroup comprises a first reference transceiver that receives leakage from the first signals, and (2) the non-overlapping transceiver included in the second partially overlapping subgroup comprises a second reference transceiver that receives leakage from the second signals.

Example 8: The antenna system of any of Examples 1-7, wherein (1) the first partially overlapping subgroup comprises a first set of member transceivers that transmit the first signals and cause the leakage from the first signals to be received by the first reference transceiver, and (2) the second partially overlapping subgroup comprises a second set of member transceivers that transmit the second signals and cause the leakage from the second signals to be received by the second reference transceiver.

Example 9: The antenna system of any of Examples 1-8, wherein the controller (1) measures a first set of differentials between the first signals transmitted by the first set of member transceivers and the leakage received by the first reference transceiver, (2) measures a second set of differentials between the second signals transmitted by the second set of member transceivers and the leakage received by the second reference transceiver, and (3) calibrates, based at least in part on the first and second sets of differentials, the plurality of transceivers with respect to the feature to improve beamforming.

Example 10: The antenna system of any of Examples 1-9, wherein the controller calibrates the plurality of transceivers by stitching together the first partially overlapping subgroup and the second partially overlapping subgroup based at least in part on the first and second leakage measurements.

Example 11: The antenna system of any of Examples 1-10, wherein (1) the first partially overlapping subgroup comprises a first transmitting auxiliary transceiver that transmits first auxiliary signals and causes leakage from the first auxiliary signals to be received by the first reference transceiver and a first receiving auxiliary transceiver, and (2) the second partially overlapping subgroup comprises a second transmitting auxiliary transceiver that transmits second auxiliary signals and causes leakage from the second auxiliary signals to be received by the second reference transceiver and a second receiving auxiliary transceiver.

Example 12: The antenna system of any of Examples 1-11, wherein the controller (1) measures a first auxiliary differential between the first auxiliary signals transmitted by the first transmitting auxiliary transceiver and the leakage from the first auxiliary signals received by the first reference transceiver or the first receiving auxiliary transceiver, (2) calibrates, based at least in part on the first auxiliary differential, the first reference transceiver to the first set of member transceivers with respect to the feature, (3) measures a second auxiliary differential between the second auxiliary signals transmitted by the second transmitting auxiliary transceiver and the leakage from the second auxiliary signals received by the second reference transceiver or the second receiving auxiliary transceiver, and then (4) calibrates, based at least in part on the second auxiliary differential, the second reference transceiver to the second set of member transceivers with respect to the feature.

Example 13: The antenna system of any of Examples 1-12, wherein (1) the first transmitting auxiliary transceiver and the first receiving auxiliary transceiver are both positioned adjacent to the first reference transceiver toward a central region of the first partially overlapping group, and (2) the second transmitting auxiliary transceiver and the second receiving auxiliary transceiver are both positioned adjacent to the second reference transceiver toward a central region of the second partially overlapping group.

Example 14: The antenna system of any of Examples 1-13, wherein the feature to which the plurality of transceivers are calibrated comprises at least one of (1) a phase of each beam pattern corresponding to the plurality of transceivers or (2) a magnitude of each beam pattern corresponding to the plurality of transceivers.

Example 15: The antenna system of any of Examples 1-14, wherein the plurality of transceivers are not equipped with calibration circuitry.

Example 16: A beamforming apparatus comprising (1) a plurality of transceivers capable of being calibrated over the air to improve beamforming, and (2) at least one controller communicatively coupled to the plurality of transceivers, wherein the controller (A) identifies a set of partially overlapping subgroups that include the plurality of transceivers, (B) obtains leakage measurements taken in connection with signals emitted by at least one transceiver included in each of the partially overlapping subgroups, (C) identifies, within the leakage measurements, a subset of leakage measurements taken in connection with an overlapping transceiver and multiple non-overlapping transceivers included in the set of partially overlapping subgroups, and (D) calibrates, based at least in part on the subset of leakage measurements, the plurality of transceivers with respect to at least one feature to improve beamforming.

Example 17: The beamforming apparatus of Example 16, wherein the controller (1) obtains a first set of leakage measurements taken in connection with first signals emitted by at least one transceiver included in a first partially overlapping subgroup within the set of partially overlapping subgroups, (2) obtains a second set of leakage measurements taken in connection with second signals emitted by at least one transceiver included in a second partially overlapping subgroup within the set of partially overlapping subgroups, (3) identifies, within the first set of leakage measurements, a first leakage measurement taken in connection with a non-overlapping transceiver included in the first partially overlapping subgroup and at least one overlapping transceiver included in both the first partially overlapping subgroup and the second partially overlapping subgroup, (4) identifies, within the second set of leakage measurements, a second leakage measurement taken in connection with the non-overlapping transceiver included in the second partially overlapping subgroup and the overlapping transceiver included in both the first partially overlapping subgroup and the second partially overlapping subgroup, and (5) calibrates, based at least in part on the first and second leakage measurements, the plurality of transceivers with respect to the feature to improve beamforming.

Example 18: The beamforming apparatus of either Example 16 or Example 17, wherein (1) the non-overlapping transceiver included in the first partially overlapping subgroup comprises a first reference transceiver that transmits the first signals, and (2) the non-overlapping transceiver included in the second partially overlapping subgroup comprises a second reference transceiver that transmits the second signals.

Example 19: The beamforming apparatus of any of Examples 16-18, wherein (1) the first partially overlapping subgroup comprises a first set of member transceivers that receive leakage from the first signals transmitted by the first reference transceiver, and (2) the second partially overlapping subgroup comprises a second set of member transceivers that receive leakage from the second signals transmitted by the second reference transceiver.

Example 20: A method comprising (1) identifying, by a controller communicatively coupled to a plurality of transceivers, a set of partially overlapping subgroups that include the plurality of transceivers, (2) obtaining, by the controller, leakage measurements taken in connection with signals emitted by at least one transceiver included in each of the partially overlapping subgroups, (3) identifying, within the leakage measurements, a subset of leakage measurements taken in connection with an overlapping transceiver and multiple non-overlapping transceivers included in the set of partially overlapping subgroups, and (4) calibrating, based at least in part on the subset of leakage measurements, the plurality of transceivers with respect to at least one feature to improve beamforming of the plurality of transceivers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An antenna system comprising:
   a plurality of transceivers capable of being calibrated over the air to improve beamforming; and
   at least one controller communicatively coupled to the plurality of transceivers, wherein the controller:
      identifies a set of partially overlapping subgroups that include the plurality of transceivers;
      obtains leakage measurements taken in connection with signals emitted by at least one transceiver included in each of the partially overlapping subgroups;
      identifies, within the leakage measurements, a subset of leakage measurements taken in connection with an overlapping transceiver and multiple non-overlapping transceivers included in the set of partially overlapping subgroups; and
      calibrates, based at least in part on the subset of leakage measurements, the plurality of transceivers with respect to at least one feature to improve beamforming.

2. The antenna system of claim 1, wherein the controller:
   obtains a first set of leakage measurements taken in connection with first signals emitted by at least one transceiver included in a first partially overlapping subgroup within the set of partially overlapping subgroups;
   obtains a second set of leakage measurements taken in connection with second signals emitted by at least one transceiver included in a second partially overlapping subgroup within the set of partially overlapping subgroups;
   identifies, within the first set of leakage measurements, a first leakage measurement taken in connection with a non-overlapping transceiver included in the first partially overlapping subgroup and at least one overlapping transceiver included in both the first partially overlapping subgroup and the second partially overlapping subgroup;
identifies, within the second set of leakage measurements, a second leakage measurement taken in connection with the non-overlapping transceiver included in the second partially overlapping subgroup and the overlapping transceiver included in both the first partially overlapping subgroup and the second partially overlapping subgroup; and
calibrates, based at least in part on the first and second leakage measurements, the plurality of transceivers with respect to the feature to improve beamforming.

3. The antenna system of claim 2, wherein:
the non-overlapping transceiver included in the first partially overlapping subgroup comprises a first reference transceiver that transmits the first signals; and
the non-overlapping transceiver included in the second partially overlapping subgroup comprises a second reference transceiver that transmits the second signals.

4. The antenna system of claim 3, wherein:
the first partially overlapping subgroup comprises a first set of member transceivers that receive leakage from the first signals transmitted by the first reference transceiver; and
the second partially overlapping subgroup comprises a second set of member transceivers that receive leakage from the second signals transmitted by the second reference transceiver.

5. The antenna system of claim 4, wherein the controller:
measures a first set of differentials between the first signals transmitted by the first reference transceiver and the leakage received by the first set of member transceivers;
measures a second set of differentials between the second signals transmitted by the second reference transceiver and the leakage received by the second set of member transceivers; and
calibrates, based at least in part on the first and second sets of differentials, the plurality of transceivers with respect to the feature to improve beamforming.

6. The antenna system of claim 4, wherein:
the first reference transceiver is positioned toward a central region of the first partially overlapping subgroup to ensure that the leakage from the first signals reaches all of the first set of member transceivers above a certain energy threshold; and
the second reference transceiver is positioned toward a central region of the second partially overlapping group to ensure that the leakage from the second signals reaches all of the second set of member transceivers above the certain energy threshold.

7. The antenna system of claim 2, wherein:
the non-overlapping transceiver included in the first partially overlapping subgroup comprises a first reference transceiver that receives leakage from the first signals; and
the non-overlapping transceiver included in the second partially overlapping subgroup comprises a second reference transceiver that receives leakage from the second signals.

8. The antenna system of claim 6, wherein:
the first partially overlapping subgroup comprises a first set of member transceivers that transmit the first signals and cause the leakage from the first signals to be received by the first reference transceiver; and the second partially overlapping subgroup comprises a second set of member transceivers that transmit the second signals and cause the leakage from the second signals to be received by the second reference transceiver.

9. The antenna system of claim 7, wherein the controller:
measures a first set of differentials between the first signals transmitted by the first set of member transceivers and the leakage received by the first reference transceiver;
measures a second set of differentials between the second signals transmitted by the second set of member transceivers and the leakage received by the second reference transceiver; and
calibrates, based at least in part on the first and second sets of differentials, the plurality of transceivers with respect to the feature to improve beamforming.

10. The antenna system of claim 8, wherein the controller calibrates the plurality of transceivers by stitching together the first partially overlapping subgroup and the second partially overlapping subgroup based at least in part on the first and second leakage measurements.

11. The antenna system of claim 8, wherein:
the first partially overlapping subgroup comprises a first transmitting auxiliary transceiver that transmits first auxiliary signals and causes leakage from the first auxiliary signals to be received by the first reference transceiver and a first receiving auxiliary transceiver; and
the second partially overlapping subgroup comprises a second transmitting auxiliary transceiver that transmits second auxiliary signals and causes leakage from the second auxiliary signals to be received by the second reference transceiver and a second receiving auxiliary transceiver.

12. The antenna system of claim 11, wherein the controller:
measures a first auxiliary differential between the first auxiliary signals transmitted by the first transmitting auxiliary transceiver and the leakage from the first auxiliary signals received by the first reference transceiver or the first receiving auxiliary transceiver;
calibrates, based at least in part on the first auxiliary differential, the first reference transceiver to the first set of member transceivers with respect to the feature;
measures a second auxiliary differential between the second auxiliary signals transmitted by the second transmitting auxiliary transceiver and the leakage from the second auxiliary signals received by the second reference transceiver or the second receiving auxiliary transceiver; and
calibrates, based at least in part on the second auxiliary differential, the second reference transceiver to the second set of member transceivers with respect to the feature.

13. The antenna system of claim 11, wherein:
the first transmitting auxiliary transceiver and the first receiving auxiliary transceiver are both positioned adjacent to the first reference transceiver toward a central region of the first partially overlapping subgroup; and
the second transmitting auxiliary transceiver and the second receiving auxiliary transceiver are both positioned adjacent to the second reference transceiver toward a central region of the second partially overlapping group.

14. The antenna system of claim 1, wherein the feature to which the plurality of transceivers are calibrated comprises at least one of:
- a phase of each beam pattern corresponding to the plurality of transceivers; or
- a magnitude of each beam pattern corresponding to the plurality of transceivers.

15. The antenna system of claim 1, wherein the plurality of transceivers are not equipped with calibration circuitry.

16. A beamforming apparatus comprising:
- a plurality of transceivers capable of being calibrated over the air to improve beamforming; and
- at least one controller communicatively coupled to the plurality of transceivers, wherein the controller:
  - identifies a set of partially overlapping subgroups that include the plurality of transceivers;
  - obtains leakage measurements taken in connection with signals emitted by at least one transceiver included in each of the partially overlapping subgroups;
  - identifies, within the leakage measurements, a subset of leakage measurements taken in connection with an overlapping transceiver and multiple non-overlapping transceivers included in the set of partially overlapping subgroups; and
  - calibrates, based at least in part on the subset of leakage measurements, the plurality of transceivers with respect to at least one feature to improve beamforming.

17. The beamforming apparatus of claim 16, wherein the controller:
- obtains a first set of leakage measurements taken in connection with first signals emitted by at least one transceiver included in a first partially overlapping subgroup within the set of partially overlapping subgroups;
- obtains a second set of leakage measurements taken in connection with second signals emitted by at least one transceiver included in a second partially overlapping subgroup within the set of partially overlapping subgroups;
- identifies, within the first set of leakage measurements, a first leakage measurement taken in connection with a non-overlapping transceiver included in the first partially overlapping subgroup and at least one overlapping transceiver included in both the first partially overlapping subgroup and the second partially overlapping subgroup;
- identifies, within the second set of leakage measurements, a second leakage measurement taken in connection with the non-overlapping transceiver included in the second partially overlapping subgroup and the overlapping transceiver included in both the first partially overlapping subgroup and the second partially overlapping subgroup; and
- calibrates, based at least in part on the first and second leakage measurements, the plurality of transceivers with respect to the feature to improve beamforming.

18. The beamforming apparatus of claim 17, wherein:
- the non-overlapping transceiver included in the first partially overlapping subgroup comprises a first reference transceiver that transmits the first signals; and
- the non-overlapping transceiver included in the second partially overlapping subgroup comprises a second reference transceiver that transmits the second signals.

19. The beamforming apparatus of claim 18, wherein:
- the first partially overlapping subgroup comprises a first set of member transceivers that receive leakage from the first signals transmitted by the first reference transceiver; and
- the second partially overlapping subgroup comprises a second set of member transceivers that receive leakage from the second signals transmitted by the second reference transceiver.

20. A method comprising:
- identifying, by a controller communicatively coupled to a plurality of transceivers, a set of partially overlapping subgroups that include the plurality of transceivers;
- obtaining, by the controller, leakage measurements taken in connection with signals emitted by at least one transceiver included in each of the partially overlapping subgroups;
- identifying, within the leakage measurements, a subset of leakage measurements taken in connection with an overlapping transceiver and multiple non-overlapping transceivers included in the set of partially overlapping subgroups; and
- calibrating, based at least in part on the subset of leakage measurements, the plurality of transceivers with respect to at least one feature to improve beamforming of the plurality of transceivers.

* * * * *